United States Patent
Matsui et al.

(10) Patent No.: US 10,500,696 B2
(45) Date of Patent: Dec. 10, 2019

(54) METHOD OF DETECTING CLOGGING OF CHUCK TABLE AND PROCESSING APPARATUS

(71) Applicant: DISCO CORPORATION, Tokyo (JP)

(72) Inventors: Hideki Matsui, Tokyo (JP); Shigenori Harada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/872,175

(22) Filed: Jan. 16, 2018

(65) Prior Publication Data

US 2018/0200865 A1   Jul. 19, 2018

(30) Foreign Application Priority Data

Jan. 16, 2017   (JP) ................................. 2017-005019

(51) Int. Cl.
*B24B 49/12* (2006.01)
*G06T 7/00* (2017.01)
*B24B 7/22* (2006.01)
*B24B 41/06* (2012.01)

(52) U.S. Cl.
CPC .............. *B24B 49/12* (2013.01); *B24B 41/06* (2013.01); *G06T 7/0004* (2013.01); *G06T 7/0006* (2013.01); *B24B 7/228* (2013.01); *G06T 2207/30148* (2013.01)

(58) Field of Classification Search
CPC ....... B24B 49/12; B24B 7/228; G06T 7/0004; G06T 2207/30148
See application file for complete search history.

(56) References Cited

U.S. PATENT DOCUMENTS

| | | | | |
|---|---|---|---|---|
| 4,667,113 A * | 5/1987 | Nakajima | ............. | B23B 49/001 250/559.08 |
| 5,679,060 A * | 10/1997 | Leonard | ................ | B24B 37/345 451/285 |
| 5,963,661 A * | 10/1999 | Kato | ..................... | G06T 7/0004 348/126 |
| 6,077,147 A * | 6/2000 | Yang | ..................... | B24B 37/013 451/288 |
| 7,675,614 B2 * | 3/2010 | Sekiya | ................... | G01N 21/94 356/237.1 |
| 9,434,044 B2 * | 9/2016 | Kosuge | ............... | B24B 37/0053 |
| 10,189,182 B2 * | 1/2019 | Takekawa | .............. | B28D 7/005 |
| 2004/0098156 A1 * | 5/2004 | Hattori | ............. | G01N 21/95607 700/110 |
| 2004/0113071 A1 * | 6/2004 | Benfer | ................. | G01N 21/643 250/302 |
| 2006/0193497 A1 * | 8/2006 | Matsumoto | ........... | G06T 7/0004 382/112 |

(Continued)

FOREIGN PATENT DOCUMENTS

CN   105500137 A   *  4/2016
JP   2015-060922   3/2015

*Primary Examiner* — Jamie J Atala
*Assistant Examiner* — Michael Robert Cammarata
(74) *Attorney, Agent, or Firm* — Greer Burns & Crain Ltd.

(57) ABSTRACT

A method of detecting clogging of a chuck table includes an imaging step of capturing an image of a holding surface of the chuck table while air and water are being ejected to the holding surface of the chuck table, an image processing step of binarizing the captured image into a binary image, and a decision step of deciding a clogged ratio of the chuck table on the basis of the binary image.

8 Claims, 5 Drawing Sheets

(56) References Cited

U.S. PATENT DOCUMENTS

| | | | | |
|---|---|---|---|---|
| 2010/0119113 A1* | 5/2010 | Kuleschow | ............... | G06T 7/11 |
| | | | | 382/103 |
| 2011/0187843 A1* | 8/2011 | Johnson | ............. | A61B 1/00009 |
| | | | | 348/76 |
| 2016/0059375 A1* | 3/2016 | Ito | ........................ | B24B 37/013 |
| | | | | 382/141 |
| 2016/0370274 A1* | 12/2016 | Rowe | ........................ | G01V 8/02 |
| 2017/0345138 A1* | 11/2017 | Middlebrooks | ......... | G03F 7/705 |

* cited by examiner

METHOD OF DETECTING CLOGGING OF CHUCK TABLE AND PROCESSING APPARATUS

BACKGROUND OF THE INVENTION

Field of the Invention

The present invention relates to a method of detecting clogging of a chuck table that holds a workpiece such as a wafer or the like under suction thereon, and a processing apparatus for processing a workpiece such as a wafer or the like.

Description of the Related Art

A grinding apparatus and a cutting apparatus for processing a wafer as a workpiece have a chuck table for holding the wafer under suction thereon (see, for example, Japanese Patent Laid-open No. 2015-60922). The chuck table has a holding surface made of a porous material and held in fluid communication with a suction source. The holding surface holds the wafer under suction thereon.

If the holding surface of the chuck table or the inside of the chuck table is clogged with a contaminant such as ground or cut chips, then when the wafer is held on the chuck table under suction, the suction force acting on the wafer through the clogged region of the holding surface tends to become weak, failing to hold the wafer securely on the holding surface. While the wafer is being processed, therefore, chips may jump off the wafer on the chuck table, or the quality of the processed wafer may be adversely affected. It has heretofore been the practice for the operator to check whether a chuck table is clogged or not before a wafer is ground or cut on the chuck table. If the operator finds the checked chuck table to be clogged beyond an allowable level, then the operator replaces the chuck table with another chuck table or performs an appropriate process to remove the clogging substance from the chuck table.

According to one conventional way of checking a chuck table for clogging, the operator applies water and air at the same time to the holding surface of the chuck table while it is developing suction, and visually inspects the holding surface to see if there is any region of the holding surface where no bubbles are produced. Specifically, since no bubbles are produced in a region that is clogged with a contaminant, the operator can visually determine that the region is clogged if there are no bubbles in the region during the inspection.

SUMMARY OF THE INVENTION

However, the conventional visual clogging inspection is problematic in that it requires a large expenditure of time and labor.

It is therefore an object of the present invention to provide a method of detecting clogging of a chuck table efficiently and reliably.

In accordance with an aspect of the present invention, there is provided a method of detecting clogging of a chuck table for holding a workpiece under suction thereon, the method including an imaging step of capturing an image of a holding surface of the chuck table while air and water are being ejected to the holding surface; an image processing step of binarizing the captured image into a binary image; and a decision step of deciding a clogged ratio of the chuck table on the basis of the binary image.

Preferably, the method further includes a tolerance setting step of setting a tolerance for the clogged ratio of the chuck table. An error message is issued if the clogged ratio of the chuck table decided at the decision step exceeds the tolerance.

In accordance with another aspect of the present invention, there is provided a processing apparatus including a chuck table holding a workpiece under suction thereon; processing means for processing the workpiece; imaging means for capturing an image of a holding surface of the chuck table while air and water are being ejected to the holding surface; binarizing means for binarizing the captured image into a binary image; and decision means for deciding a clogged ratio of the chuck table on the basis of the binary image.

The method of detecting clogging of a chuck table according to the present invention makes it possible to detect clogging of the chuck table without visual inspection of the operator, and hence without a large expenditure of time and labor.

If the method includes the tolerance setting step in addition to the decision step, then an error message can be issued if the clogged ratio of the chuck table decided at the decision step exceeds the tolerance, allowing the operator to easily recognize the chuck table being clogged beyond the tolerance.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
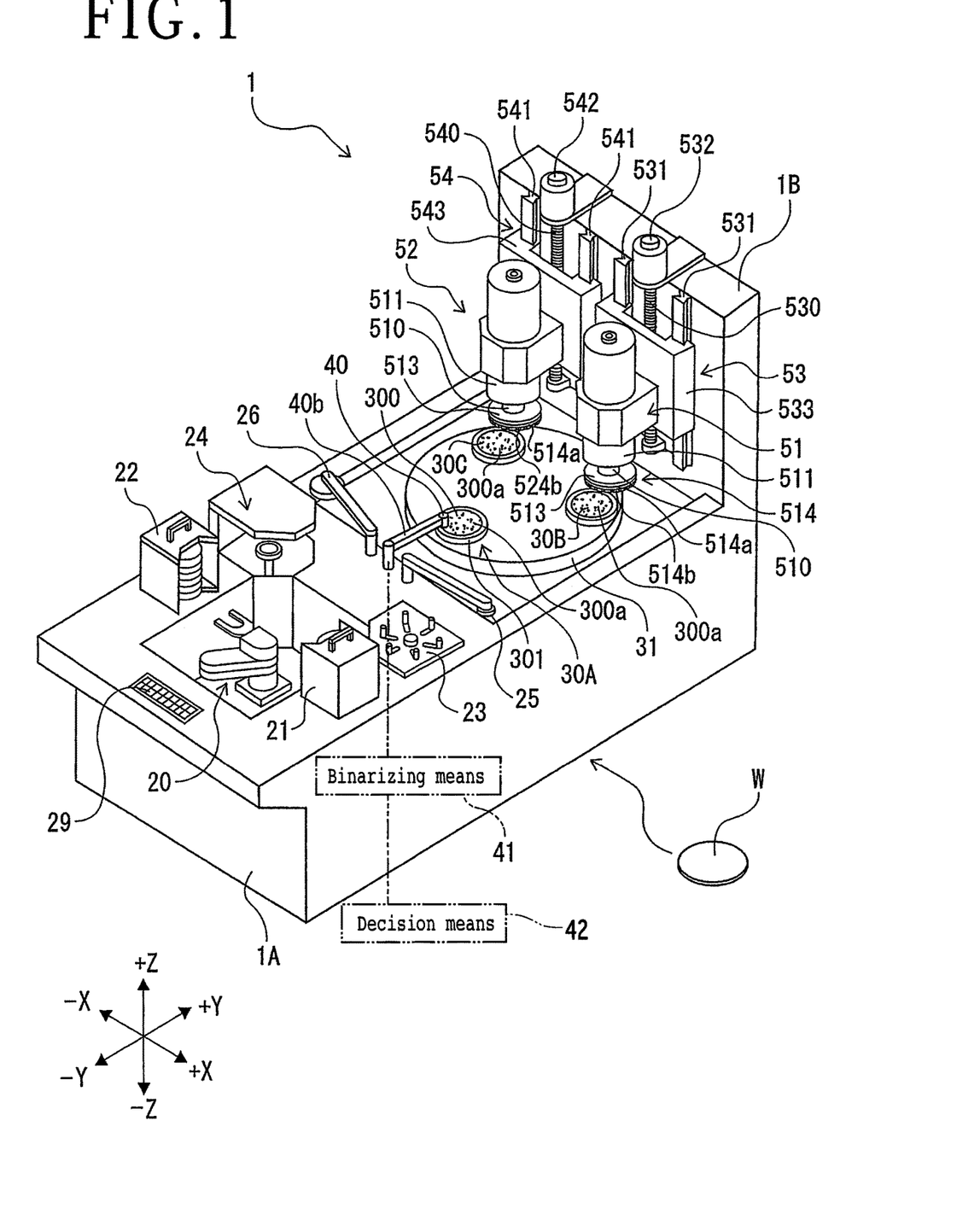
FIG. 1 is a perspective view depicting a processing apparatus by way of example.

FIG. 1 depicts in perspective a processing apparatus 1 for grinding workpieces W such as semiconductor wafers or the like according to an embodiment of the present invention. The processing apparatus 1 will hereinafter be referred to as "grinding apparatus 1." The grinding apparatus 1 includes three chuck tables 30A, 30B, and 30C for holding respective workpieces W under suction thereon, processing means 51 (hereinafter referred to as "rough grinding means 51") for grinding the workpieces W in a rough grinding mode, and processing means 52 (hereinafter referred to as "finishing grinding means 52") for grinding the workpieces W in a finishing grinding mode. The processing apparatus 1 is not limited to the grinding apparatus with two-axis processing means, but may be a grinding apparatus with one-axis processing means or a cutting apparatus for cutting a workpiece W with a rotatable cutting blade.

As depicted in FIG. 1, the grinding apparatus 1 includes a base 1A supporting on a front portion thereof extending in a −Y-axis direction a first cassette 21 for storing workpieces W to be ground and a second cassette 22 for storing ground workpieces W. A robot 20 is disposed on the front portion of the base 1A near the first cassette 21 and the second cassette 22, for unloading a workpiece W to be ground from the first cassette 21 and loading a ground workpiece W into the second cassette 22. Operating means 29 that is operated by the operator to enter processing conditions, etc. into the grinding apparatus 1 is disposed on the front end of the base 1A in front of the robot 20.

Positioning means 23 for positioning a workpiece W to be ground in a predetermined position and single-wafer cleaning means 24 for cleaning a ground workpiece W are each disposed on the base 1A in a movable range of the robot 20 behind the first cassette 21 and the second cassette 22. First feed means 25 is disposed on the base 1A in the vicinity of the positioning means 23, and second feed means 26 is disposed on the base 1A in the vicinity of the cleaning means 24. The first feed means 25 has a function to feed a workpiece W to be ground that is placed on the positioning means 23 to either one of the chuck tables 30A, 30B, and 30C. The second feed means 26 has a function to feed a ground workpiece W held on either one of the chuck tables 30A, 30B, and 30C to the cleaning means 24.

Between the first feed means 25 and the second feed means 26, there is disposed an arm 40b supported on the base 1A and extending horizontally rearwardly, i.e., in a +Y-axis direction. The arm 40b supports on its distal end imaging means 40 for capturing an image of a holding surface 300a of the chuck table 30A, for example. The imaging means 40 includes a light emitter for emitting and applying light to the holding surface 300a, for example, and a camera that includes an optical system for catching and focusing light reflected from the holding surface 300a and an image pickup element (charge-coupled device (CCD)) for outputting an electric signal representing the reflected light focused thereon. The position and makeup of the imaging means 40 are not limited to those according to the illustrated embodiment.

Binarizing means 41 for binarizing images captured by the imaging means 40 is electrically connected to the imaging means 40. Decision means 42 is electrically connected to the binarizing means 41, so that binarized images can be transmitted from the binarizing means 41 to the decision means 42. The decision means 42, which includes a central processing unit (CPU) and a storage element such as a memory or the like, is able to decide how much the chuck tables 30A, 30B, and 30C are clogged from binarized images, as described later.

The grinding apparatus 1 also includes a circular turntable 31 rotatably disposed on the base 1A behind the first feed means 25, i.e., spaced from the first feed means 25 in the +Y-axis direction. The chuck tables 30A, 30B, and 30C are mounted on an upper surface of the turntable 31 at angularly spaced intervals in the circumferential directions of the turntable 31. The turntable 31 is rotatable on the base 1A about a central axis thereof that extends in Z-axis directions. The three chuck tables 30A, 30B, and 30C revolve around the central axis of the turntable 31 upon rotation of the turntable 31. The number of chuck tables disposed on the turntable 31 is not limited to the three in the illustrated embodiment. If the processing apparatus 1 is a grinding apparatus with one-axis processing means, then it may have one chuck table reciprocally movable straight along the Y-axis directions by Y-axis moving means including a ball screw and a motor, etc.

Figure 2:
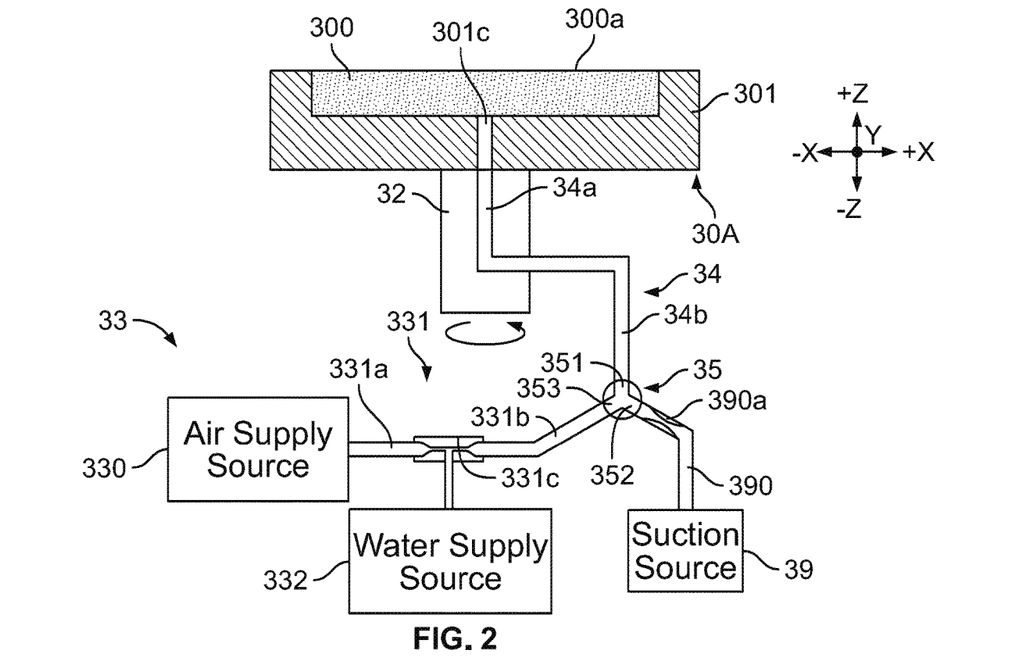
FIG. 2 is a cross-sectional view, partly in block form, depicting by way of example the structures of a chuck table and ejecting means.

The chuck table 30A, which is of a circular outer profile as depicted in FIGS. 1 and 2, includes a suction attractor 300 made of a porous material for attracting a workpiece W under suction, and a frame 301 supporting the suction attractor 300 thereon. The chuck table 30B and the chuck table 30C depicted in FIG. 1 are of the same structure as the chuck table 30A and will not be described in detail below. The suction attractor 300 of the chuck table 30A is held in fluid communication with a suction source 39 depicted in FIG. 2 which includes a compressor and a vacuum generator, etc. When the suction source 39 is actuated to draw in air, it produces a suction force that is transmitted to the holding surface 300a as an upper exposed surface of the suction attractor 300, so that the chuck table 30A holds the workpiece W under suction on the holding surface 300a. The holding surface 300a may include a conical surface inclined with a very small gradient and having a vertex at the center of rotation of the holding surface 300a or a flat surface lying flush with the upper surface of the frame 301.

The chuck table 30A is rotatable about its central axis that extends in the Z-axis directions on the turntable 31 (not depicted in FIG. 2) by rotating means 32 disposed on the bottom surface of the chuck table 30A. The frame 301 has a through hole 301c defined in its bottom thicknesswise in the Z-axis directions. A fluid communication passage 34 which includes a flexible tube, a metal pipe, or the like has an end 34a held in fluid communication with the through hole 301c. The fluid communication passage 34 extends through the rotating means 32 through a rotary joint or the like.

The fluid communication passage 34 has an opposite end 34b connected to a first joint port 351 of a three-way pipe 35. The three-way pipe 35 has a second joint port 352 connected to a pipe 390 that is held in fluid communication with the suction source 39. The pipe 390 includes an on-off valve 390a disposed therein for selectively opening and closing a suction fluid path that is provided jointly by the suction source 39, the pipe 390, the three-way pipe 35, and the fluid communication passage 34. For holding a workpiece W under suction on the chuck table 30A, the on-off valve 390a is open.

The grinding apparatus 1 includes ejecting means 33 for ejecting air and water from the holding surface 300a of the chuck table 30A. The ejecting means 33 includes, for example, an air supply source 330, a supply pipe 331 having an end 331a connected to the air supply source 330 and an opposite end 331b connected to a third joint port 353 of the three-way pipe 35, and a water supply source 332 held in fluid communication with the supply pipe 331. The ejecting means 33 also serves as means for cleaning the suction attractor 300 of the chuck table 30A. Specifically, the ejecting means 33 can displace air and water under a very high pressure from within the suction attractor 300 to the exposed holding surface 300a thereof, thereby discharging ground chips or debris out of the suction'attractor 300.

According to the present embodiment, the water supply source 332 has a pump, etc., for example, for mechanically delivering water, e.g., pure water, into the supply pipe 331. The supply pipe 331 includes an on-off valve 331c disposed therein for selectively opening and closing the supply pipe 331. When the on-off valve 331c is opened while the ejecting means 33 is in operation, a two-fluid mixture of air delivered from the air supply source 330 into the supply pipe 331 and water delivered from the water supply source 332 into the supply pipe 331 is supplied through the supply pipe 331 and fluid communication passage 34 to the chuck table 30. When the on-off valve 331c is closed, it blocks the supply pipe 331 to prevent the two-fluid mixture from flowing to the three-way pipe 35.

As is the case with the chuck table 30A, the chuck table 30B and the chuck table 30C depicted in FIG. 1 are also rotatable by their respective rotating means 32, suction forces from their respective suction sources 39 can be transmitted to their respective holding surfaces 300a, and air and water can be ejected from their respective holding surfaces 300a by their respective ejecting means 33.

The structural details of the ejecting means 33 and the structural details of the suction fluid path jointly made up of the suction source 39, the pipe 390, the three-way pipe 35, and the fluid communication passage 34 are not limited to those according to the illustrated embodiment, but may be changed or modified appropriately. For example, with respect to the structural details of the suction fluid path jointly made up of the suction source 39, the pipe 390, the three-way pipe 35, and the fluid communication passage 34, the on-off valve 390a may not be provided in the pipe 390, but an electric three-way directional control valve may be provided in the three-way pipe 35. With such an electric three-way directional control valve provided in the three-way pipe 35, an ejector may be provided instead of the on-off valve 331c in the supply pipe 331 of the ejecting means 33. According to such a modification, when air supplied from the air supply source 330 into the supply pipe 331 flows through the ejector, the ejector produces an ejector effect due to the speed of the air, drawing water from the water supply source 332 into the supply pipe 331 rather than mechanically pumping water from the water supply source 332 into the supply pipe 331, so that a two-fluid mixture of air and water can be delivered into the fluid communication passage 34.

As depicted in FIG. 1, the grinding apparatus 1 also includes an upstanding column 1B on a rear end of the base 1A which is spaced from the turntable 31 rearwardly, i.e., in the +Y-axis direction. On a side surface of the column 1B which faces forwardly, i.e., in the -Y-axis direction, there are mounted first grinding feed means 53 for grinding-feeding the rough grinding means 51 in the Z-axis directions and second grinding feed means 54 for grinding-feeding the finishing grinding means 52 in the Z-axis directions. The first grinding feed means 53 and the second grinding feed means 54 are juxtaposed or disposed side by side on the column 1B.

The first grinding feed means 53 includes a ball screw 530 having a central axis extending vertically in the Z-axis directions, a pair of spaced guide rails 531 disposed parallel to the ball screw 530, a motor 532 for rotating the ball screw 530 about its central axis, and a vertically movable block 533 having a nut disposed therein that is threaded over the ball screw 530 and a pair of side legs held in sliding contact with the respective guide rails 531. When the motor 532 rotates the ball screw 530 about its central axis, the vertically movable block 533 moves vertically along the ball screw 530 while being guided by the guide rails 531. The vertically movable block 533 supports the rough grinding means 51 thereon, so that the rough grinding means 51 vertically moves as the vertically movable block 533 vertically moves.

The second grinding feed means 54 includes a ball screw 540 having a central axis extending vertically in the Z-axis directions, a pair of spaced guide rails 541 disposed parallel to the ball screw 540, a motor 542 for rotating the ball screw 540 about its central axis, and a vertically movable block 543 having a nut disposed therein that is threaded over the ball screw 540 and a pair of side legs held in sliding contact with the respective guide rails 541. When the motor 542 rotates the ball screw 540 about its central axis, the vertically movable block 543 moves vertically along the ball screw 540 while being guided by the guide rails 541. The vertically movable block 543 supports the finishing grinding means 52 thereon, so that the finishing grinding means 52 vertically moves as the vertically movable block 543 vertically moves.

The rough grinding means 51 includes a rotational shaft 510 having a vertically extending central axis, a spindle housing 511 by which the rotational shaft 510 is rotatably supported, a motor, not depicted, for rotating the rotational shaft 510 about its central axis, a circular mount 513 connected to the lower end of the rotational shaft 510, and a grinding wheel 514 detachably joined to the lower surface of the mount 513. The grinding wheel 514 has an annular wheel base 514a and a plurality of rough grinding stones 514b, each substantially in the shape of a rectangular parallelepiped, arranged in an annular pattern on the bottom surface of the annular wheel base 514a. The rough grinding stones 514b contain abrasive grains whose sizes are relatively large.

The finishing grinding means 52 includes a plurality of finishing grinding stones 524b that are rotatably supported on a grinding wheel. The finishing grinding stones 524b serve to perform a finishing grinding process on a workpiece W that has been thinned substantially to a finished thickness, thereby to increase the planarity of the ground surface of the workpiece W. The finishing grinding stones 524b contain abrasive grains whose sizes are smaller than the abrasive grains contained in the rough grinding stones 514b of the rough grinding means 51. The structural details of the finishing grinding means 52 other than the finishing grinding stones 524b are identical to those of the rough grinding means 51, and will not be described in detail below.

A method of detecting clogging of a chuck table according to the present invention, which is to be carried out to detect clogging of the chuck tables 30A, 30B, and 30C of the grinding apparatus 1, will be described below. The method of detecting clogging of a chuck table according to the present invention is carried out after a plurality of workpieces W have been ground by the grinding apparatus 1 and before another workpiece W is to be ground by the grinding apparatus 1, i.e., when a workpiece W is to be ground by the grinding apparatus 1 while the chuck tables 30A, 30B, and 30C may have possibly been clogged by ground chips or debris.

(1) Tolerance Setting Step:

According to the present embodiment, for example, the operator enters a tolerance for the degree to which the chuck tables 30A, 30B, and 30C are clogged (hereinafter also referred to as "clogging tolerance") from the operating means 29 into the grinding apparatus 1, and the entered clogging tolerance is stored in the memory of the decision means 42. The clogging tolerance for the chuck tables will be described in (4) decision step to be described later. The tolerance setting step may not necessarily be performed initially in the clogging detecting method, but may be performed at least prior to (4) decision step to be described later.

(2) Imaging Step:

Next, the turntable 31 depicted in FIG. 1 rotates about its central axis, causing the chuck tables 30A, 30B, and 30C to revolve until the chuck table 30A, for example, is positioned beneath the imaging means 40 so that the entire holding surface 300a of the chuck table 30A is located within an image capturing range of the imaging means 40.

Then, water and air are ejected to the holding surface 300a of the chuck table 30A. Specifically, the on-off valve 331c in the supply pipe 331 of the ejecting means 33 depicted in FIG. 2 is opened, and the on-off valve 390a in the pipe 390 that is held in fluid communication with the suction source 39 is closed. The air supply source 330 supplies air under a predetermined pressure to the supply pipe 331, and the water supply source 332 supplies a predetermined amount of water to the supply pipe 331. In the supply pipe 331, the air and the water are mixed into a two-fluid mixture, which flows through the on-off valve 331c, the three-way pipe 35, the fluid communication passage 34, and the through hole 301c in the frame 301 of the chuck table 30A, and reaches the suction attractor 300, from which the two-fluid mixture, i.e., the air and the water, are ejected through the holding surface 300a. At this time, the on-off valve 390a is closed, preventing the air and the water from flowing into the suction source 39.

A sufficient amount of air is dissolved under high pressure in the water which is flowing through the fluid communication passage 34. Therefore, the air contained in the water as it is ejected out of the suction attractor 300 through the pores of the holding surface 300a and depressurized continuously produces bubbles in the presence of excessive air. In those regions of the holding surface 300a which are not clogged by ground chips or debris, bubbles from the ejected air are repeatedly produced and eliminated. On the other hand, in those regions of the holding surface 300a which are clogged by ground chips or debris, the air and the water are not ejected from the holding surface 300a due to the clogging, and no bubbles are produced.

While the air and the water are being ejected from the holding surface 300a, i.e., while bubbles from the ejected air are being repeatedly produced and eliminated, the light emitter of the imaging means 40 depicted in FIG. 1 emits a predetermined amount of light toward the holding surface 300a. The emitted light is applied to the holding surface 300a, and the holding surface 300a from which the air and the water are being ejected reflects light back to the image pickup element of the camera of the imaging means 40. The reflected light is focused by the optical system of the imaging means 40 onto the image pickup element, which generates a captured image G1 depicted in FIG. 3 that represents the entire holding surface 300a where bubbles are formed by the air and the water that are being ejected. The captured image G1 depicts that the air and the water that are being ejected produces bubbles essentially all over the holding surface 300a. The imaging means 40 may capture an image at each of a plurality of predetermined unit time intervals, thereby producing a plurality of successive captured images.

Figure 3:
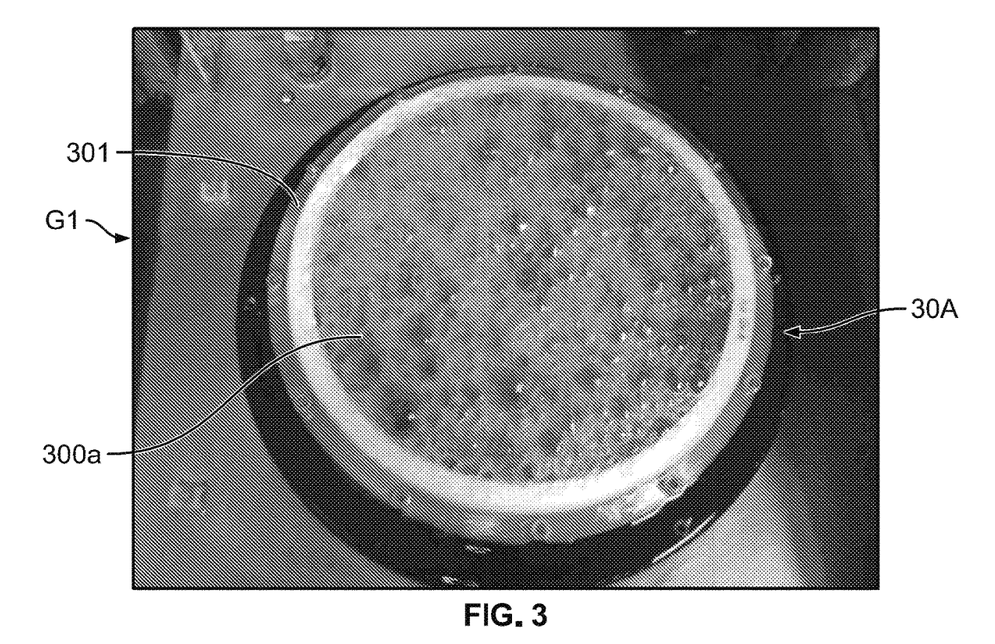
FIG. 3 is a diagram depicting a captured image of the overall holding surface of the chuck table.

(3) Image Processing Step:

The captured image G1, which represents the overall holding surface 300a where bubbles are formed by the air and the water that are being ejected as depicted in FIG. 3, is transferred from the imaging means 40 to the binarizing means 41 depicted in FIG. 1. The binarizing means 41 binarizes the captured image G1 with a predetermined slice level (threshold value), thereby producing a binary image. Specifically, the binarizing means 41 converts the captured image G1, made up of pixels each having a luminance level in the range of 0 to 255, into a binary image G11 depicted in FIG. 4, by changing those pixels of the captured image G1 whose luminance levels are lower than the slice level to pixels having a luminance level of 0 and those pixels of the captured image G1 whose luminance levels are higher than the slice level to pixels having a luminance level of 255.

Figure 4:
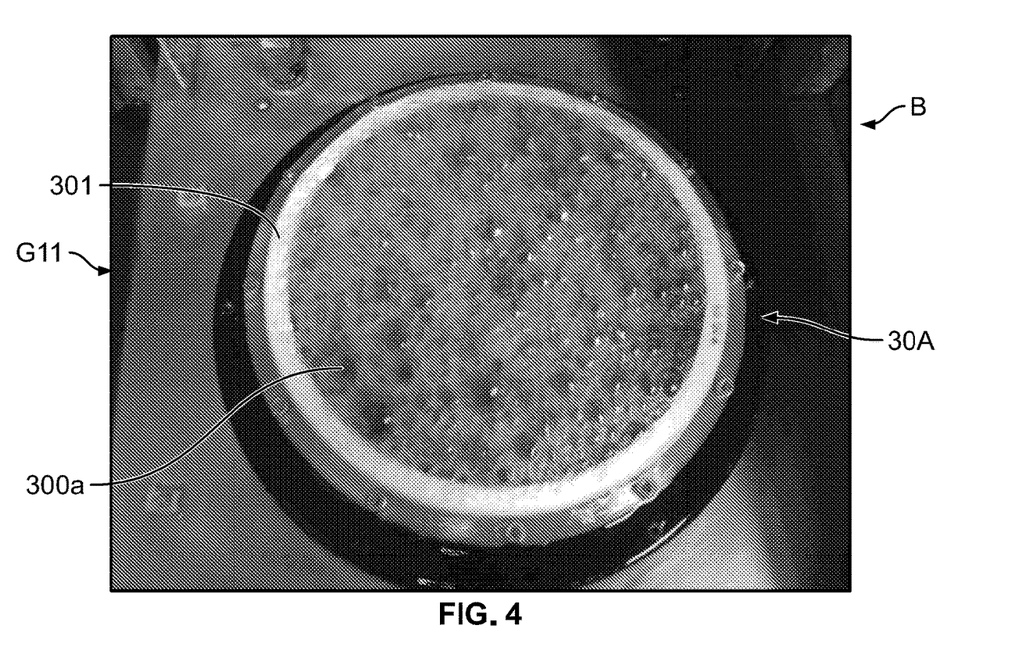
FIG. 4 is a diagram depicting a binarized image of the holding surface of the chuck table, displayed on an output screen.

(4) Decision Step:

Data representing the binary image G11 produced by the imaging processing step are sent from the binarizing means 41 to the decision means 42. The decision means 42 displays the binary image G11 on a hypothetical output screen B having a predetermined resolution, as depicted in FIG. 4. In the binary image G11 displayed on the output screen B, the upper surface of the frame 301 of the chuck table 30A is displayed as an annular white image made up of pixels whose luminance levels are equal to or higher than the slice level. Regions of the holding surface 300a where bubbles are formed by the air and the water that are being ejected, i.e., which are not clogged by ground chips or debris, disposed radially inwardly of the upper surface of the frame 301, are displayed as white regions made up of pixels whose luminance levels are equal to or higher than the slice level because of the bubbles. Other regions of the holding surface 300a where bubbles are not formed by the air and the water that are being ejected, i.e., which are clogged by ground chips or debris, disposed radially inwardly of the upper surface of the frame 301, are displayed as black regions made up of pixels whose luminance levels are lower than the slice level because of the lack of bubbles.

The decision means 42 calculates the sum of pixels making up the black regions of the holding surface 300a in the binary image G11 depicted in FIG. 4 as the size (the number of pixels) of the clogged regions of the holding surface 300a. Then, the decision means 42 calculates a ratio of the size of clogged regions of the holding surface 300a to the size of the overall holding surface 300a, as a clogged ratio. For example, the ratio of the size of clogged regions of the holding surface 300a to the size of the overall holding surface 300a, i.e., the clogged ratio, in the binary image G11 is 7.8%.

If the imaging means 40 produces a plurality of successive images by capturing an image at each of a plurality of predetermined unit time intervals in the imaging step, then the binarizing means 41 produces a plurality of binary images in the binarizing step. In the decision step, therefore, since the decision means 42 uses a plurality of binary images as information for decision making, it can determine a more accurate clogged ratio independent of the way in which bubbles are repeatedly produced and eliminated over time on the holding surface 300a.

In (1) tolerance setting step, the decision means 42 stores in its memory the clogging tolerance, i.e., the tolerance for the degree to which the chuck tables 30A, 30B, and 30C are clogged, or in other words, an allowable clogged ratio of the size of clogged regions of the holding surface 300a to the size of the overall holding surface 300a in the binary image. According to the present embodiment, the clogging tolerance for the chuck tables 30A, 30B, and 30C is 40%, for example. However, the clogging tolerance is not limited to such a numerical value, but may be variable depending on the thickness of the suction attractor 300 of each of the chuck tables 30A, 30B, and 30C, and the fineness (porosity) of the pores of the porous material that makes up the suction attractor 300. The decision means 42 compares the clogged ratio (7.8%) of the holding surface 300a in the binary image G11 with the clogging tolerance (40%) stored in its memory, and decides that the clogged ratio of the chuck table 30A, for example, falls within the tolerance.

As described above, the method of detecting clogging of a chuck table according to the present invention includes the imaging step of capturing an image of the holding surface 300a of the chuck table 30A while air and water are being ejected to the holding surface 300a, the image processing step of binarizing the captured image G1 into the binary image G11, and the decision step of deciding a clogged ratio of the chuck table 30A on the basis of the binary image G11. Consequently, it is possible to detect clogging of the chuck table 30A without visual inspection of the operator, and hence without a large expenditure of time and labor.

Figure 5:
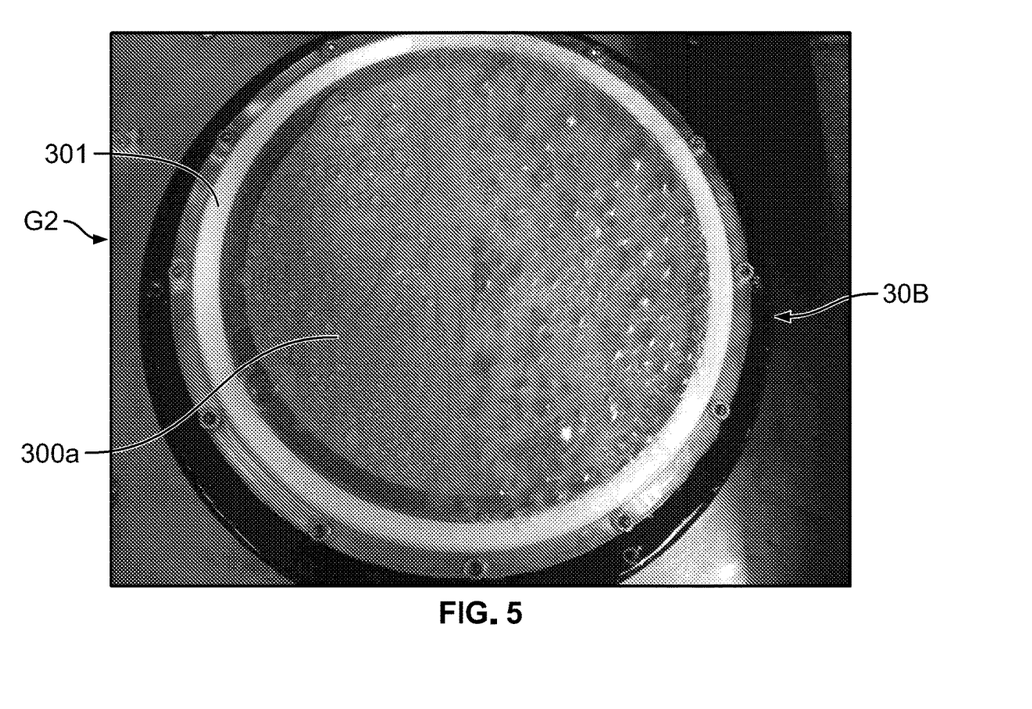
FIG. 5 is a diagram depicting a captured image of the overall holding surface of another chuck table.
Figure 6:
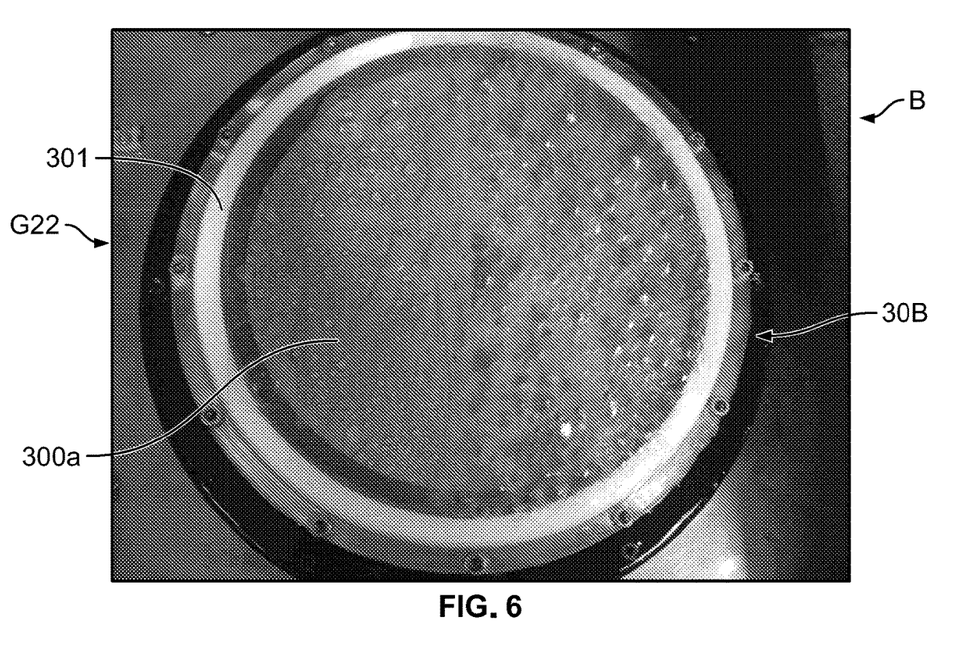
FIG. 6 is a diagram depicting a binarized image of the holding surface of the other chuck table, displayed on an output screen.

The chuck table 30B is also processed to detect clogging thereof in the same manner as the chuck table 30A is processed to detect clogging thereof. In other words, (2) imaging step, (3) image processing step, and (4) decision step as described above are successively carried out with respect to the chuck table 30B. FIG. 5 depicts a captured image G2, taken by the imaging means 40 in the imaging step, of the overall holding surface 300a where bubbles are formed by the air and the water that are being ejected. As can be seen from the captured image G2, bubbles are formed by the air and the water that are being ejected in regions of the holding surface 300a that are nearly 70 percent of the overall holding surface 300a. FIG. 6 depicts a binary image G22 displayed on the hypothetical output screen B, which is produced by binarizing the captured image G2 with the binarizing means 41 in the image processing step. For example, the ratio of the size of clogged regions of the holding surface 300a to the size of the overall holding surface 300a, i.e., the clogged ratio, in the binary image G22, decided by the decision means 42 in the decision step, is 34.1%. In the decision step, the decision means 42 compares the clogged ratio (34.1%) of the holding surface 300a in the binary image G22 with the clogging tolerance (40%) stored in its memory, and decides that the clogged ratio of the chuck table 30B falls within the tolerance.

Figure 7:
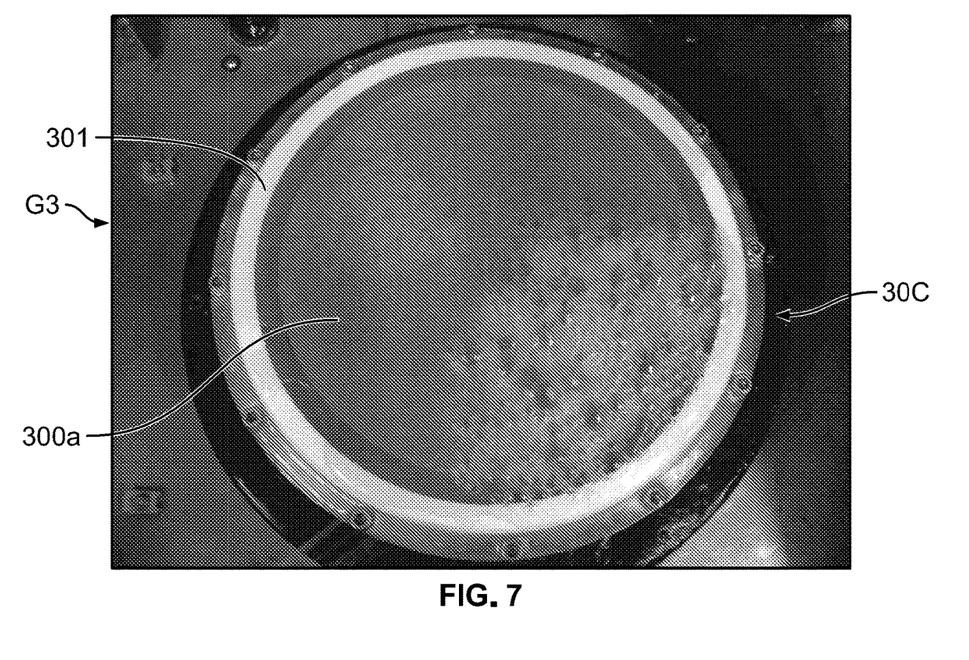
FIG. 7 is a diagram depicting a captured image of the overall holding surface of still another chuck table.
Figure 8:
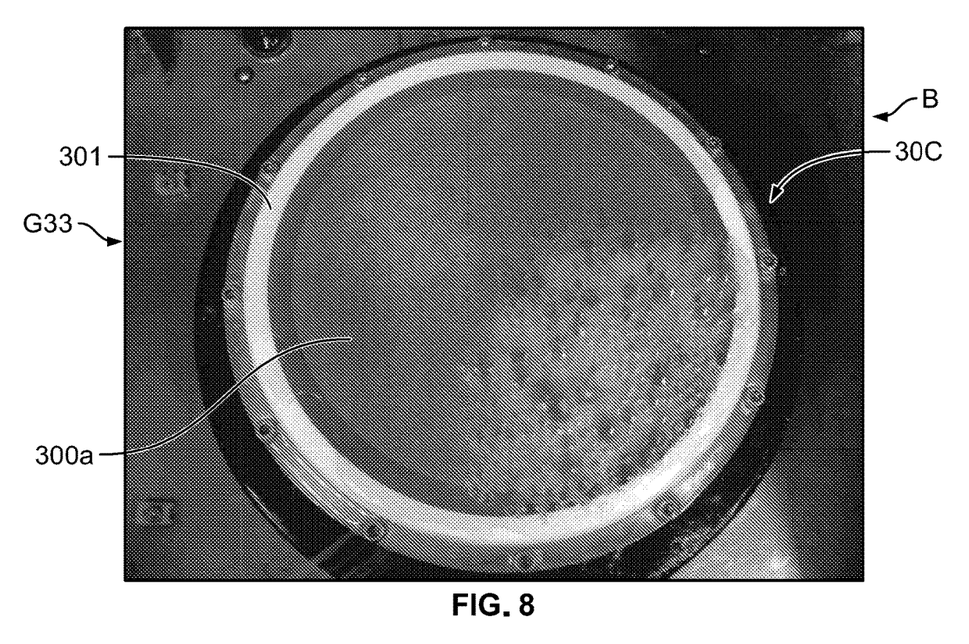
FIG. 8 is a diagram depicting a binarized image of the holding surface of the still other chuck table, displayed on an output screen.

Furthermore, the chuck table 30C is also processed to detect clogging thereof in the same manner as the chuck table 30B is processed to detect clogging thereof. In other words, (2) imaging step, (3) image processing step, and (4) decision step as described above are successively carried out with respect to the chuck table 30C. FIG. 7 depicts a captured image G3, taken by the imaging means 40 in the imaging step, of the overall holding surface 300a where bubbles are formed by the air and the water that are being ejected. As can be seen from the captured image G3, bubbles are formed by the air and the water that are being ejected in regions of the holding surface 300a that are approximately one quarter of the overall holding surface 300a. FIG. 8 depicts a binary image G33 displayed on the hypothetical output screen B, which is produced by binarizing the captured image G3 with the binarizing means 41 in the image processing step. For example, the ratio of the size of clogged regions of the holding surface 300a to the size of the overall holding surface 300a, i.e., the clogged ratio, in the binary image G33, decided by the decision means 42 in the decision step, is 44.0%. In the decision step, the decision means 42 compares the clogged ratio (44.0%) of the holding surface 300a in the binary image G33 with the clogging tolerance (40%) stored in its memory, and decides that the clogged ratio of the chuck table 30C is beyond the tolerance. The decision means 42 then displays information indicating that the clogged ratio of the chuck table 30C exceeds the tolerance, i.e., error information indicating that the chuck table 30C is not suitable for use in a grinding process, on a display monitor, not depicted, or announces such information as a warning from a speaker, for example.

As described above, the method of detecting clogging of a chuck table according to the present invention further includes the tolerance setting step of setting a tolerance for the clogging ratio of the chuck table, i.e., a clogging tolerance. If the clogging ratio of the chuck table 30C decided in the decision step as described above exceeds the clogging tolerance, then the decision means 42 issues an error message, allowing the operator to easily recognize the chuck table 30C being clogged beyond the clogging tolerance.

Having recognizing that the chuck table 30C has been clogged beyond the clogging tolerance, for example, the operator replaces the chuck table 30C with another chuck table. Alternatively, the operator performs a self-grinding process for grinding the holding surface 300a of the chuck table 300 with the grinding stones to remove the clogging of the chuck table 30C beyond the clogging tolerance. Specifically, for example, in the self-grinding process, the turntable 31 depicted in FIG. 1 rotates about its central axis counterclockwise as viewed in the +Z-axis direction, causing the chuck table 30C to revolve to a position beneath the rough grinding means 51 where the rough grinding stones 514b and the chuck table 30C are positioned in vertical alignment with each other. The rotational shaft 510 of the rough grinding means 51 depicted in FIG. 1 is rotated about its central axis, rotating the rough grinding stones 514b. The rough grinding means 51 is moved in the −Z-axis direction, i.e., lowered, by the first grinding feed means 53. The rotating rough grinding stones 514b are thus brought into contact with the holding surface 300a of the chuck table 30C, thereby grinding the holding surface 300a and the upper surface of the frame 301. During the self-grinding process, the chuck table 30C is also rotated about its own central axis, so that the overall holding surface 300a is ground. When the overall holding surface 300a is ground to a predetermined depth, the clogged regions of the suction attractor 300 are also ground away. In this manner, the clogging of the chuck table 30C is eliminated.

The method of detecting clogging of a chuck table according to the present invention is not limited to the illustrated embodiment, and the structural details of the grinding apparatus 1 are not limited to the illustrated embodiment either. The method and the processing apparatus according to the present invention can be modified within the scope of the invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of detecting clogging of a chuck table for holding a workpiece under suction thereon, the method comprising:
    an ejecting step of ejecting air and water through a holding surface of the chuck table;
    an imaging step of capturing an image of the holding surface of the chuck table while the air and water are being ejected through the holding surface;
    an image processing step of binarizing the captured image into a binary image; and
    a decision step of determining a clogged ratio of the chuck table on the basis of the binary image, wherein said clogged ratio is a total area of clogged regions of the holding surface compared to a total area of the holding surface.

2. The method of detecting clogging of a chuck table according to claim 1, further comprising:
- a tolerance setting step of setting a tolerance for the clogged ratio of the chuck table; and
- an error message being issued if the clogged ratio of the chuck table decided at the decision step exceeds the tolerance.

3. A processing apparatus comprising:
- a chuck table holding a workpiece under suction thereon, said chuck table including a holding surface and an ejector, said ejector being configured to eject air and water through the holding surface;
- processing means for processing the workpiece;
- imaging means for capturing an image of a holding surface of the chuck table while air and water are being ejected through the holding surface;
- a binarizer configured for binarizing the captured image into a binary image; and
- decision means for deciding a clogged ratio of the chuck table on the basis of the binary image, wherein said clogged ratio is a total area of clogged regions of the holding surface compared to a total area of the holding surface.

4. The method of detecting clogging of a chuck table according to claim 1, wherein said imaging step includes capturing an image of the holding surface at each of a plurality of predetermined time intervals thereby producing a plurality of successive captured images of the holding surface, and wherein said image processing step produces a plurality of binary images based on the plurality of successive captured images.

5. The method of detecting clogging of a chuck table according to claim 2, further comprising replacing the chuck table with another chuck table after the error message is issued.

6. The method of detecting clogging of a chuck table according to claim 2, further comprising grinding the holding surface of the chuck table to remove the clogged regions after the error message is issued.

7. The method of detecting clogging of a chuck table according to claim 2, wherein the tolerance of the clogged ratio is set at 40%.

8. The apparatus according to claim 3, wherein the clogged ratio is set at 40%.

* * * * *